Patented July 15, 1947

2,424,029

UNITED STATES PATENT OFFICE 2,424,029

CYCLOPROPYLALKYL ETHERS AS INSECTICIDES

Herbert L. J. Haller, Washington, D. C., assignor to the United States of America, as represented by the Secretary of Agriculture No Drawing. Application October 10, 1942, Serial No. 461,602

3 Claims. (Cl. 167—30)

(Granted under the act of March 3, 1883, as amended April 30, 1928; 370 O. G. 757)

This application is made under the act of March 3, 1883, as amended by the act of April 30, 1928, and the invention herein described, if patented, may be manufactured and used by or for the Government of the United States of America for governmental purposes without the payment to me of any royalty thereon.

This invention relates to improvements in materials for destroying or checking the growth or multiplication of harmful organisms.

An object of the invention is to provide a material suitable for use as a fumigant.

Another object of the invention is to provide a material for fumigating wheat and other grains which will not injuriously affect the milling properties of the grain, the baking qualities of the flour made therefrom, or the value as feedstuffs of the grain or of the bran and other byproducts.

Still another object of the invention is to provide a material which is relatively non-toxic to man and which can be used in place of hydrocyanic acid or gas or carbon bisulfide for destroying insects.

I have found that cyclopropyl alkyl ethers are effective insecticides; that they do not bleach or otherwise injure clothing and fabrics; that they do not corrode metals, and it has been shown [Jour. Pharm. 69: 207 (1940)] that they are relatively non-toxic to man. The cyclopropyl alkyl ethers are therefore suitable for fumigating insects in grain, clothing, carpets, upholstered furniture, raisins and other foodstuffs in buildings where it is undesirable to use a fumigant highly poisonous to man.

The preparation of the cyclopropyl alkyl ethers may be illustrated by the formation of cyclopropyl methyl ether. 1,3-glyceryl dibromide is converted into its methyl ether by treatment with dimethyl sulfate. The dibromoether on treatment with zinc yields cyclopropyl methyl ether. It boils at 43.5–44° C., has a density at 25° C. of 0.786, and has an odor similar to that of cyclopropane.

The following table, based on tests, shows by comparison with carbon disulfide the lethal effectiveness of the various cyclopropyl alkyl ethers. The tests were conducted on the confused flour beetle, Tribolium confusum, and under the same conditions. The concentrations indicated are in terms of milligrams per liter of the evaporated substances.

| Material | Concentrations necessary for 50% mortality | Concentrations necessary for 95% mortality |
|---|---|---|
| Carbon disulfide | 56 | 100 |
| Cyclopropyl ethyl ether | 40 | 50 |
| Cyclopropyl methyl ether | 82 | 105 |
| Cyclopropyl propyl ether | 72 | 105 |

While the use of cyclopropyl alkyl ethers has been described against a specific pest, their application as insecticides is not restricted to it. The cyclopropyl alkyl ethers may be used to kill flies, mosquitoes, and other household insects; or as a fumigant to kill any insect in an enclosed space such as insects on trees or other vegetation temporarily confined under a fumigating tent; insects in clothing, carpets, furs, upholstered furniture, etc., in a fumigating vault; insects in drawers, closets, trunks, boxes or rooms that can be tightly closed; insects in mills, warehouses, ships, etc., and other places where vapors of the fumigant can be confined for a definite period of time.

They may also be used in combination with other insecticides and fumigants, such as methyl bromide, carbon disulfide, hydrogen cyanide, ethylene oxide, ethylene dichloride, and the like.

What is claimed is:

1. A process for destroying insects comprising evaporating cyclopropyl alkyl ether having not more than three carbon atoms in the alkyl group in the air surrounding the insects.

2. A process for destroying insects comprising applying cyclopropyl alkyl ether having not more than three carbon atoms in the alkyl group to the insects.

3. An insect-destroying medium comprising air containing vapors of cyclopropyl alkyl ether having not more than three carbon atoms in the alkyl group in concentration sufficient to have lethal effect on insects in the medium.

HERBERT L. J. HALLER.